United States Patent Office 3,256,298
Patented June 14, 1966

3,256,298
NOVEL THIETANES AND THEIR PREPARATION
John R. Kilsheimer, Westfield, N.J., and Manfred Sander, Frankfurt am Main, Germany, assignors to Socony Mobil Oil Company, Inc., a corporation of New York
No Drawing. Filed Mar. 6, 1963, Ser. No. 263,116
13 Claims. (Cl. 260—327)

The present invention relates to a novel class of heterocyclic organic sulfur compounds and their synthesis and, in particular, to novel 3-aryloxythietanes of the general formula:

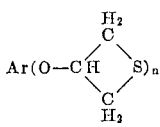

wherein $n$ is an integer of at least 1, and Ar is an aromatic-containing radical and wherein the oxygen in said structure is linked directly to a ring carbon. More particularly, the present invention relates to compounds of the following general formula:

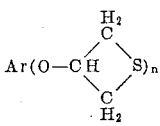

wherein $n$ is an integer of 1 to 6, inclusive, and Ar has the aforesaid significance.

In reference to synthesis of such compounds, the method embodied herein comprises reacting an alkali salt of a suitable phenolic compound with 3-chloropropene sulfide-1 in aqueous solution and, in an embodiment, by reacting a suitable phenolic compound with the 3-chloropropene sulfide-1 in an aqueous alkali solution. In illustration, using phenol, an aqueous solution of alkali metal hydroxide (e.g., NaOH, KOH) and 3-chloropropene sulfide-1 as reactants, it is quite possible that the following reaction mechanism occurs to produce the desired 3-aryloxythietanes.

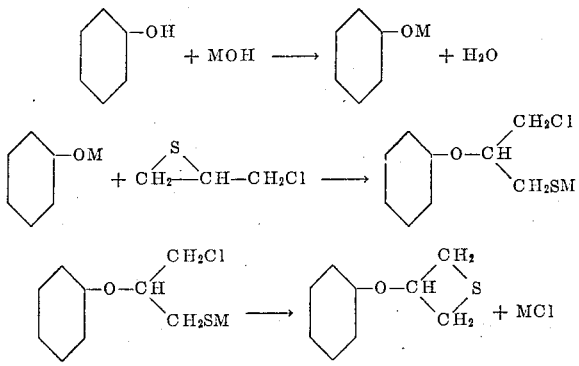

where M is an alkali.

To the best of our knowledge, the synthesis of the 3-aryloxythietanes by the process embodied herein is unexpected as the analogous reaction of phenols with epichlorohydrin in aqueous alkali solution substantially exclusively yields aryloxypropeneoxides, as per the following:

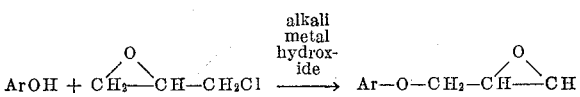

Hence, it would have been expected that replacement of the epichlorohydrin by chloropropene sulfide would produce the aryloxypropene sulfide but, as described more fully hereinafter, the 3-aryloxythietanes are produced.

In some cases, a small amount of the corresponding aryloxypropene sulfide may be formed as a byproduct of the reaction embodied herein. In such an event, the by-product can be separated from the desired thietanes by heating the crude reaction product to polymerize the aryloxypropene sulfide, which tends to polymerize at temperatures substantially lower than about 150° C., up to which the aryloxythietanes are stable in the absence of air. Other methods of separation include crystallization, solvent extraction by use of selective solvents as the aryloxythietanes are generally more difficultly soluble in most solvents than are the aryloxypropene sulfides, and by then are the aryloxypropene sulfides, and by use of the differences normally existing in melting points with the thietanes generally having a higher melting point than the aryloxypropene sulfides. An additional method of separation involves chemical reaction of the crude reaction product with, for example, amines or carboxylic acids that react with the aryloxypropene sulfides but not readily with the aryloxythietanes.

In general, the process embodied herein is carried out by reacting an amount of the chloropropene sulfide at least equivalent to the number of phenolic hydroxyl groups present in the phenolic reactant. In such a case, when all of the hydroxyl groups are to be substituted, the alkali and chloropropene sulfide can be used in excess. In cases wherein less than all of the hydroxyl groups of a polyphenolic substance are to be converted, as in the case of synthesis of p-hydroxyphenoxythietane from hydroquinone, the amount of alkali and chloropropene sulfide that is used is less than that sufficient to substitute all of the hydroxy groups of the phenolic substance.

The reaction embodied herein can be carried out over a wide temperature range. Such a temperature range includes temperatures below room temperatures and above 100° C. but, preferably, the reaction is carried out at an elevated temperature, such as between about 50 and about 100° C.

In reference to the phenolic substance for use in the process embodied herein, suitable for such use are aromatic compounds containing at least one phenolic hydroxyl group. Thus, suitable substances include unsubstituted and substituted monophenols such as phenol, naphthol, alkyl phenols, alkoxy phenols, aryloxy phenols, nitro phenols, halophenols and amino phenols; aromatic compounds having a plurality of phenolic hydroxyl groups such as resorcinol, hydroquinone, dihydroxydiphenyl, dihydroxydiphenylalkanes, dihydroxyanthracenes, and substituted derivatives thereof. Specific examples of suitable phenolic substances include 2,6-dichlorophenol, 2,4-dichlorophenol, p-chlorophenol, o-chlorophenol, 2,4,5-trichlorophenol, p-methoxyphenol, p-nitrophenol, bisphenol A, 1-bromo-2-naphthol, 4-chloro-1-naphthol, and others.

In order to further describe the invention, the following embodiments are set forth for purposes of illustration and not limitation.

Example 1

Phenoxythietane

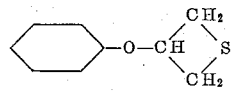

114 grams of phenol was dissolved in 160 milliliters of 25% aqueous sodium hydroxide solution. To this solution 152 grams of 3-chloropropene sulfide-1 was slowly added with stirring. An exothermic reaction occurred that raised the temperature of the reaction mixture slightly. Thereupon the reaction mixture was stirred for three hours at 70° C. The mixture was allowed to cool and extracted three times with ether, the ethereal solution washed three times with 5% caustic soda solution and three times with water, dried over sodium sulfate and concentrated by evaporation. The residue consisted of 118 grams of a light-brown oil which contained 18.6% of total sulfur and 3.1% of thiirane sulfur.

Vacuum distillation of this product gave 85 grams of distillate (B.P.$_{12}$ 132–140° C.) which crystallized on standing. After it had been recrystallized twice from petroleum ether, the substance melted sharply at 39° C. and analyzed as follows: (calculated values shown are for phenoxy thietane).

Analysis:
```
    C _____ 64.9% (calc. 65.1%).
    H _____ 6.1% (calc. 6.0%).
    S _____ 19.2% (calc. 19.3%).
    Thiirane sulfur _____ 0%.
    Thiol sulfur _____ 0%.
    Cl _____ 0%.
    Molecular weight
      (cryoscopic determination) 164 (calc. 166).
```

The NMR spectrum of the substance showed three proton resonance signal groups at 415, 312 and 204 cps. (related to tetramethyl silane=0). The signal group at 415 cps. corresponds to 5 protons (aromatic H). The signal at 312 cps. shows one proton (H at tertiary C) and the signal group at 204 cps. shows four protons (H at secondary C).

Example 2
p-Chlorophenoxythietane

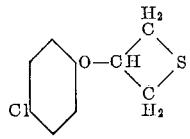

77.2 grams of p-chlorophenol was dissolved in a solution of 24.5 grams of NaOH in 100 milliliters of water, followed by slow addition of 84 grams of 3-chloropropene sulfide-1. An exothermic reaction occurred that raised the temperature to 45° C., following which the reaction mixture was stirred for three hours at 70° C. Upon cooling, the mixture was extracted three times with chloroform, the chloroform solution washed three times with 5% caustic soda solution, washed to neutral reaction with water, dried over Na$_2$SO$_4$ and concentrated by evaporation. 100 grams of crude product was obtained in the form of an oily crystal slurry. Recrystallization from ethanol gave 65 grams of pure product (melting point 53° C.) that analyzed as follows: (calculated values shown are for p-chlorophenoxythietane).

Analysis:
```
    Total sulfur _____ 16.1% (calc. 16.0%).
    Thiirane sulfur ____ 0.5% (calc. 0%).
    Chlorine _____ 17.6% (calc. 17.6%).
```

Example 3
o-Chlorophenoxythietane

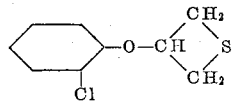

77.2 grams of o-chlorophenol were caused to react with 24.5 grams of NaOH and 84.6 grams of chloropropene sulfide in 100 milliliters of water and worked up as described in Example 2. 109 grams of a yellow oil was obtained as crude product which contained less than 0.5% of thiirane sulfur. Vacuum distillation furnished 72.5 grams of distillate (B.P.$_{0.2}$ 112–115° C.) which crystallized at room temperature. Recrystallization from petroleum ether (50–75) furnished 50 grams of pure product with a melting point of 27° C. and having the following analysis: (calculated values are for o-chlorophenoxythietane).

Analysis:
```
    S _____ 16.3% (calc. 16.0%).
    Cl _____ 17.6% (calc. 17.7%).
```

Example 4
2,4-dichlorophenoxythietane

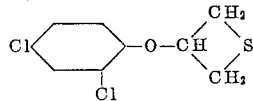

Analogous to Example 2, 97.8 grams of 2,4-dichlorophenol was reacted with 24.0 grams of NaOH and 65.2 grams of chloropropene sulfide in 100 milliliters of water and worked up as described in Example 2. 122.4 grams of a crystalline crude product was obtained. Upon recrystallization from petroleum ether, the substance melted at 61–62° C. and analyzed as follow: (calculated values are for 2,4-dichlorophenoxythietane).

Analysis:
```
    S _____ 13.8% (calc. 13.6%).
    Cl _____ 30.2% (calc. 30.2%).
    Thiirane S _____ 0%.
```

Example 5
2,4,5-trichlorophenoxythietane

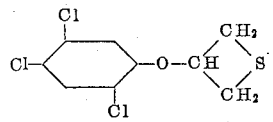

Analogous to Example 2, 118.5 grams of 2,4,5-trichlorophenol was reacted with 24.0 grams of NaOH and 65.2 grams of chloropropene sulfide in 100 milliliters of water and worked up as described in Example 2. 143.6 grams of a crystalline crude product was obtained. Upon recrystallization from petroleum ether, the substance melted at 72–73° C. and analyzed as follows: (calculated values are for 2,4,5-trichlorophenoxythietane).

Analysis:
```
    S _____ 12.2% (calc. 11.8%).
    Cl _____ 39.3% (calc. 39.5%).
```

Example 6
p-Tert. butylphenoxythietane

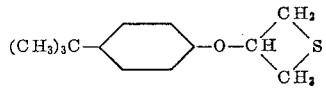

As described in Example 2, 90.1 grams of p-tert.-butylphenol was reacted with 24.0 grams of NaOH and 65.2 grams of chloropropene sulfied in 100 milliliters of water and worked up. 116.4 grams of a liquid crude product was obtained which contained 14.2% of sulfur. Vacuum distillation gave 60 grams of distillate (B.P.$_{0.2}$ 122–125° C.) which crystallized on cooling. A sample repeatedly recrystallized from petroleum ether melted at 25.5° C. and analyzed as follows: (calculated values are for p-tert.-butylphenoxythietane).

Analysis:
```
    S _____ 14.5% (calc. 14.4%).
    Thiirane S _____ 0%.
```

Example 7
p-Methoxyphenoxythietane

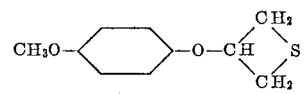

As described in Example 2, 74.5 grams of p-methoxyphenol was reacted with 24 grams of NaOH and 84.6 grams of chloropropene sulfide in 100 milliliters of water and worked up. 108.3 grams of an oily crystal slurry was obtained as crude product which contained 5.2% of thiirane sulfur. Vacuum distillation gave 51.6 grams of distillate (B.P.$_{0.05}$ 125–130° C.) which crystallized completely on storing. After crystallization from petroleum ether (100–140) the substance melted at 65° C. and analyzed as follows: (calculated values are for p-methoxyphenoxythietane).

Analysis:
    S _____ 16.4% (calc. 16.34%).
    Thiirane S _____ 0%.

*Example 8* p-Nitrophenoxythietane

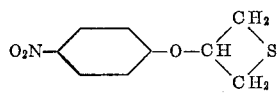

83.5 grams of p-nitrophenol, 24 grams of NaOH and 84.6 grams of chloropropene sulfide were reacted in 100 milliliters of water in the manner described in Example 2. Working up after extraction with chloroform and washing with caustic soda solution gave 72.4 grams of a crystalline crude product. From the alkaline washing liquors 34 grams of nitrophenol was recovered by acidification. The crude product was recrystallized twice from petroleum ether (100–140) resulting in 33.2 grams of light-yellow crystals with a melting point of 105.5% C. and analyzed as follows: (calculated values are for p-nitrophenoxythietane).

Analysis:
    S _____ 15.3% (calc. 15.2%).
    Thiirane S _____ 0%.

*Example 9*

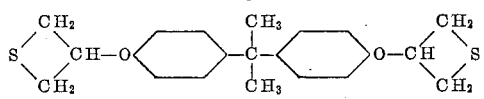

137 grams of bisphenol A was dissolved in a solution of 48 grams of NaOH in 300 milliliters of water. At 40 to 60° C., 130.5 grams of chloropropene sulfide was added dropwise to this solution, followed by stirring at 70° C. The reaction mixture was extracted with chloroform, the chloroform solution washed three times with 5% caustic soda solution, once with dilute sulfuric acid and twice with water. 186 grams of an oily product was obtained after evaporation. The crude product, after heating for ten hours at 80 to 100° C., turned highly viscous. Extraction of this product with ether gave 118 grams of an oil substance which contained 17.6% of sulfur (calc. for $C_{21}H_{24}O_2S_2$: 17.2% S).

*Example 10*

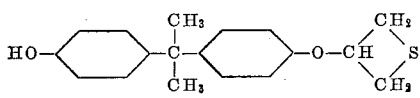

22.1 grams of bisphenol A, 4 grams of NaOH and 13 grams of chloropropene sulfide were stirred for three hours in 30 milliliters of water at 60° C. Thereupon the product was treated with benzene, the benzene solution washed with water, dried and evaporated. 31 grams of a viscous substance obtained after the evaporation, analyzed as follows: (calculated values are for the compound structurally shown in this example).

Analysis:
    S _____ 10.2% (calc. 10.7%).
    Molecular weight _____ 307 (calc. 302).

The novel 3-phenoxythietanes embodied herein are crystalline or oily substances that, though not very reactive, do undergo reactions characteristic of thietanes, such as reactions with oxidants, with halogen, with carboxylic halides, and with organo-metallic compounds. They possess utility as stabilizers and plasticizers for rubber and plastics, e.g., polyvinylchloride.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. As a new chemical compound, 3-aryloxythietane of the following formula:

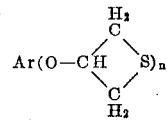

wherein $n$ is an integer of 1 to 6 inclusive, Ar is an aromatic radical selected from the group consisting of an aromatic hydrocarbon radical and an aromatic hydrocarbon radical having at least one nuclear substituent selected from the group consisting of halogen, $C_1$–$C_4$ alkyl, methoxy, nitro and hydroxyl; and the oxygen in said formula is linked to a ring carbon of said aromatic radical.

2. A compound, as defined in claim 1, wherein the aromatic radical is phenyl and $n$ is one.

3. A compound, as defined in claim 1, wherein the aromatic radical is p-chlorophenyl and $n$ is one.

4. A compound, as defined in claim 1, wherein the aromatic radical is o-chlorophenyl and $n$ is one.

5. A compound, as defined in claim 1, wherein the aromatic radical is p-methoxyphenyl and $n$ is one.

6. A compound, as defined in claim 1, wherein $n$ is two and the aromatic radical has the formula:

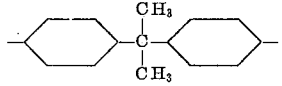

7. A method for preparation of 3-aryloxythietane of the following formula:

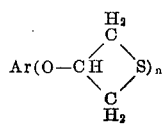

wherein $n$ is an integer of 1 to 6 inclusive; Ar is an aromatic radical selected from the group consisting of an aromatic hydrocarbon radical and an aromatic hydrocarbon radical having at least one nuclear substituent selected from the group consisting of halogen, $C_1$–$C_4$ alkyl, methoxy, nitro and hydroxyl; and the oxygen in said formula is linked to a ring carbon of said aromatic radical; which method comprises reacting 3-chloropropene sulfide-1 in an aqueous reaction medium with an alkali salt of a compound selected from the group consisting of a phenolic compound and a phenolic compound having at least one nuclear substituent selected from the group consisting of halogen, $C_1$–$C_4$ alkyl, methoxy, nitro and hydroxyl.

8. A method, as defined in claim 7, wherein the 3-chloropropene sulfide-1 is reacted with an aqueous alkali solution of a phenolic compound.

9. A method, as defined in claim 7, wherein the alkali is an alkali metal.

10. A method, as defined in claim 9, wherein the alkali metal is sodium.

11. A method, as defined in claim 7, wherein the reaction is carried out at a temperature of from about 20 to about 100° C.

12. A method, as defined in claim 7, wherein the reaction is carried out by use of a ratio of at least one mole of the chloropropene sulfide per alkali equivalent in said salt.

13. A method, as defined in claim 7, wherein the alkali salt is an alkali metal salt of phenol and $n$ is 1.

References Cited by the Examiner

UNITED STATES PATENTS

| | | | |
|---|---|---|---|
| 2,824,845 | 2/1958 | Kosmin | 260—327 |
| 2,965,651 | 12/1960 | Kosmin | 370—327 |

OTHER REFERENCES

Leuttringhaus Chemical Abstracts, Subject Index for July–December 1962 (December 31, 1962), page 2487S.

WALTER A. MODANCE, *Primary Examiner.*

JAMES A. PATTEN, *Assistant Examiner.*